(No Model.)

N. HAWKINS.
Screw Conveyer.

No. 234,868.        Patented Nov. 30, 1880.

WITNESSES:
J. C. Wilcke
Arthur W. Glessner.

INVENTOR:
Nehemiah Hawkins

UNITED STATES PATENT OFFICE.

NEHEMIAH HAWKINS, OF CHICAGO, ILLINOIS.

SCREW-CONVEYER.

SPECIFICATION forming part of Letters Patent No. 234,868, dated November 30, 1880.

Application filed June 17, 1880. (No model.)

*To all whom it may concern:*

Be it known that I, NEHEMIAH HAWKINS, of Chicago, in the county of Cook, State of Illinois, have invented certain Improvements in Screw-Conveyers, of which the following is a true and exact description, reference being had to the accompanying drawings, in which—

Figure 1:
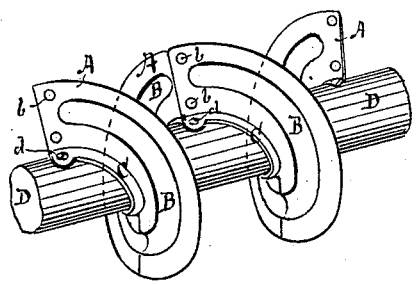
Figure 2:
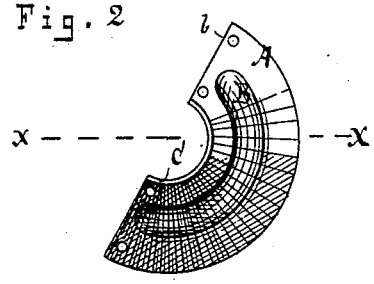
Figure 3:
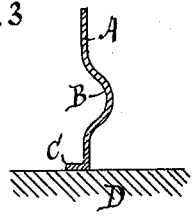

Figure 1 shows a perspective view of a portion of my improved conveyer. Fig. 2 is a view of a conveyer-flight detached. Fig. 3 shows a cross-section of a flight on line $x\,x$ of Fig. 2.

The use and construction of grain and mill conveyers, in itself, is old. The conveyer-screw consists of the shaft and coil, and the latter is generally composed of a system of flights so arranged as to form a continuous spiral screw.

My invention relates to the construction of an improved conveyer-flight.

The prime quality demanded of a good conveyer is strength and rigidity of the flight, combined with small weight, as also a good, perfect connection of the flights to the shaft. The wrought-iron flight seems to be best adapted in regard to weight; but when made of sheet-iron, in the ordinary manner, it lacks rigidity, more especially in conveyer-screws of greater diameter. To remedy this fault I provide the wrought-iron flight A with an annular corrugation, B, as shown in the drawings, whereby the strength and rigidity of the flight are greatly increased without adding to the weight or cost. To produce this corrugated flight the plate-iron is cut into proper shape, and is then pressed, red-hot, between two heavy iron plates—male and female—which are properly molded, so as to form the true screw shape of the flight, with its corrugation B, as also the flange C, whereby the flight is fastened to the shaft D. For conveyers of greater diameter two or more such annular corrugations may be formed, if so desired.

The different flights are connected at their ends by rivets $b$, thus forming a continuous screw-line, and are then fastened to the shaft by screws or rivets $d$ penetrating the ears of flange C.

I am well aware that wrought-iron flights with a radial straight and smooth surface are not new, and have been made long ago.

What I claim as my invention, and desire to secure by Letters Patent, is—

A wrought-iron conveyer-flight, A, provided with one or more annular corrugations, B, for the purpose set forth.

NEHEMIAH HAWKINS.

Witnesses:
J. C. WILCKE,
ARTHUR W. GLESSNER.